(12) United States Patent
Koshimizu

(10) Patent No.: US 11,906,388 B2
(45) Date of Patent: Feb. 20, 2024

(54) LASER PROCESSING MACHINE AND STATE DETECTION METHOD FOR OPTICAL COMPONENT

(71) Applicant: Amada Co., Ltd., Kanagawa (JP)

(72) Inventor: Hiroshi Koshimizu, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 732 days.

(21) Appl. No.: 17/052,824

(22) PCT Filed: Mar. 25, 2019

(86) PCT No.: PCT/JP2019/012301
§ 371 (c)(1),
(2) Date: Nov. 4, 2020

(87) PCT Pub. No.: WO2019/216040
PCT Pub. Date: Nov. 14, 2019

(65) Prior Publication Data
US 2021/0239566 A1     Aug. 5, 2021

(30) Foreign Application Priority Data
May 10, 2018   (JP) ................................. 2018-091101

(51) Int. Cl.
*G01B 9/00*         (2006.01)
*G01M 11/02*     (2006.01)
*B23K 26/06*      (2014.01)

(52) U.S. Cl.
CPC ..... *G01M 11/0285* (2013.01); *B23K 26/0648* (2013.01)

(58) Field of Classification Search
CPC ........... G01M 11/0285; B23K 26/0648; B23K 26/0665; B23K 26/707; G01N 2021/9583
See application file for complete search history.

(56) References Cited

U.S. PATENT DOCUMENTS 5,231,261 A * 7/1993 Duthoo .............. B23K 26/0648
                                                            219/121.76
10,413,996 B2 * 9/2019 Ito .......................... B23K 26/38
(Continued)

FOREIGN PATENT DOCUMENTS

JP      S60-066226 A     4/1985
JP      H01-99792 A      4/1989
(Continued)

OTHER PUBLICATIONS

International Search Report for corresponding Application No. PCT/JP2019/012301, dated Jun. 11, 2019.
(Continued)

*Primary Examiner* — Uzma Alam
*Assistant Examiner* — Jonathon Cook
(74) *Attorney, Agent, or Firm* — Renner, Otto, Boisselle & Sklar, LLP

(57) ABSTRACT

A beam irradiation unit (a collimator unit, a processing head, and a nozzle) includes a plurality of optical components, and is configured to convert a laser beam, which is divergent light, to collimated light and then to condense the light to irradiate a sheet metal. A photodetection element (a photodiode) detects intensity of reflected light reflected by an inspected optical component that is one of the plurality of optical components. A control device (an NC device) controls irradiation of a pierced hole with the laser beam as inspection light, subsequently to piercing the portion of the sheet metal to be cut to manufacture a product, and compares, with a threshold, the intensity of the reflected light detected by the photodetection element during the irradiation with the inspection light, to detect whether the inspected optical component is deteriorated, or a degree of the deterioration.

10 Claims, 7 Drawing Sheets

(56) References Cited

U.S. PATENT DOCUMENTS

| | | | |
|---|---|---|---|
| 2007/0000889 A1 | 1/2007 | Yamazaki et al. | |
| 2014/0042133 A1* | 2/2014 | Weick .................. | B23K 26/707 |
| | | | 219/121.81 |
| 2019/0061066 A1* | 2/2019 | Izumi ................ | B23K 26/0648 |

FOREIGN PATENT DOCUMENTS

| | | |
|---|---|---|
| JP | H11-97776 A | 4/1999 |
| JP | 2001-246489 A | 9/2001 |
| JP | 2021-314992 A | 11/2001 |
| JP | 2005-334924 A | 12/2005 |
| JP | 2012-155159 A | 8/2012 |

OTHER PUBLICATIONS

Written Opinion for corresponding Application No. PCT/JP2019/012301, dated Jun. 11, 2019.
Extended European Search Report for corresponding EP Application No. 19800527.4 dated Aug. 6, 2021.

* cited by examiner

DURING PIERCING

DURING STATE DETECTION

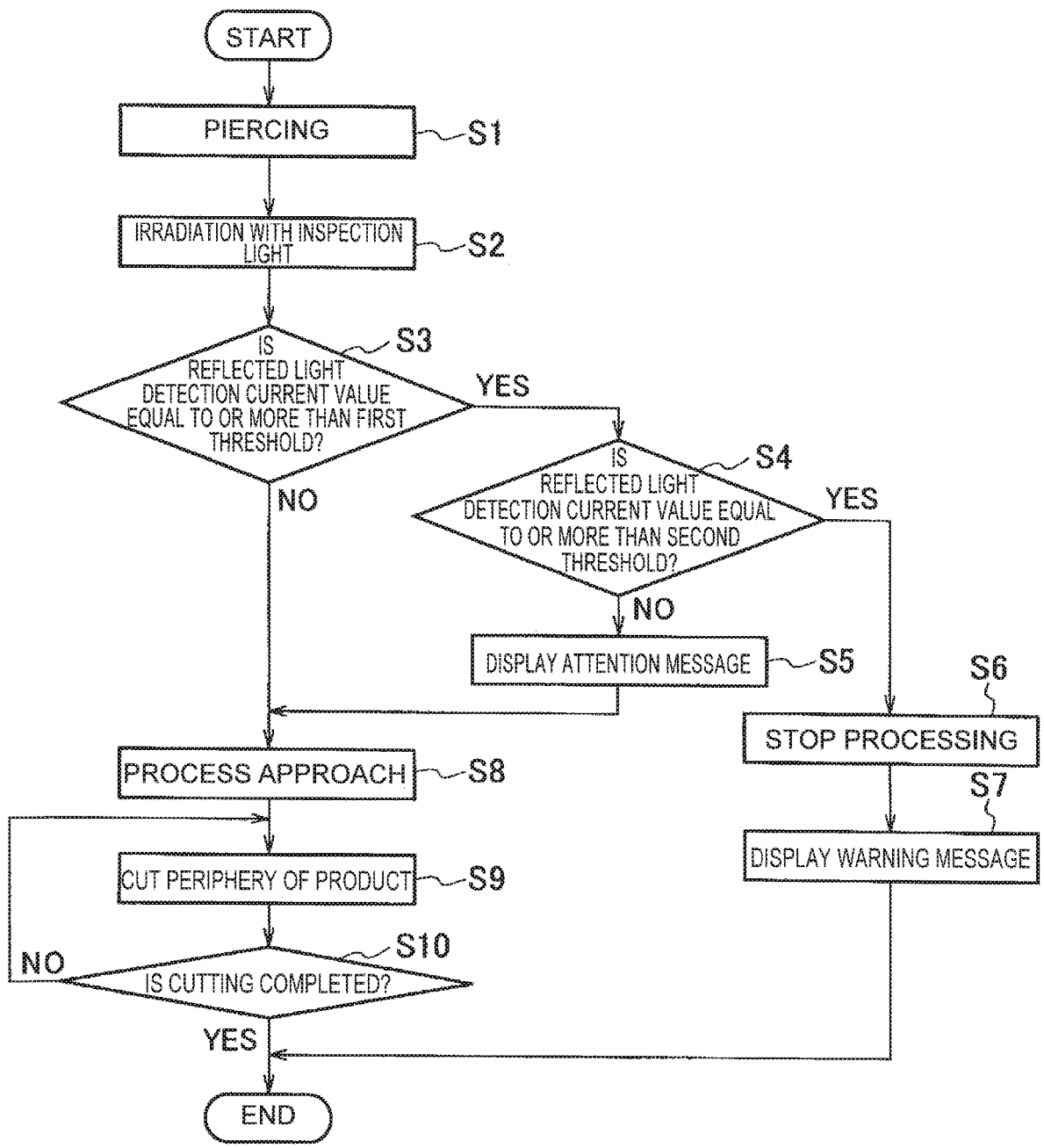

LASER PROCESSING MACHINE AND STATE DETECTION METHOD FOR OPTICAL COMPONENT

TECHNICAL FIELD

The present disclosure relates to a laser processing machine and a state detection method for an optical component.

BACKGROUND ART

A laser processing machine that cuts a sheet metal with a laser beam emitted from a laser oscillator is widely used. The laser processing machine comprises various optical components such as a lens that condenses the laser beam, and a mirror that reflects the laser beam. For example, if the optical components are dirty and deteriorated, the laser processing machine might not cut the sheet metal on set suitable conditions.

As an example, if the lens is dirty and worn, an anti-reflective coating applied to a surface of the lens is deteriorated. Consequently, transmittance of the laser beam decreases and reflectance increases to raise a temperature of the lens. Then, a focus of the laser beam condensed in a vicinity of a surface of the sheet metal might shift, and cause poor cutting.

CITATION LIST

Patent Literature

Patent Literature 1: Japanese Patent Laid-Open No. 2005-334924

SUMMARY

In general, a unit that stores an optical component includes a semi-sealed structure, and a user of a laser processing machine cannot inspect the optical component in the unit. To solve this problem, a configuration is desired in which a state of the optical component is detected and the user can be notified of deterioration of the optical component if any.

Patent Literature 1 discloses a dirt detection technique for an optical component in which an output detecting device directly detects an output value of a laser beam condensed with a condenser lens. Such a configuration as described in Patent Literature 1 is not favorable because a detection process that is separate from a sheet metal processing process has to be provided.

An object of an embodiment is to provide a laser processing machine and a state detection method for an optical component, capable of detecting a state of the optical component in a process of sheet metal processing, and detecting whether the optical component is deteriorated, or a degree of the deterioration.

According to a first aspect of the embodiment, provided is a laser processing machine comprising a beam irradiation unit including a plurality of optical components and configured to convert a laser beam, which is divergent light, to collimated light and then to condense the light to irradiate a sheet metal, a photodetection element configured to detect intensity of reflected light reflected by an inspected optical component that is one of the plurality of optical components, and a control device configured to execute control in such a manner that a pierced hole is formed, by piercing, for cutting the sheet metal to manufacture a product and then the pierced hole is irradiated with the laser beam as inspection light, and compare, with a threshold, the intensity of the reflected light detected by the photodetection element during the irradiation with the inspection light, to detect whether the inspected optical component is deteriorated, or a degree of the deterioration.

According to a second aspect of the embodiment, provided is a state detection method for an optical component, comprising: piercing a portion of a sheet metal for cutting the sheet metal to manufacture a product, irradiating the pierced hole with a laser beam as inspection light, detecting intensity of reflected light reflected by an inspected optical component during the irradiation with the inspection light, and comparing the intensity of the reflected light with a threshold, to detect whether the inspected optical component is deteriorated, or a degree of the deterioration.

According to a laser processing machine and a state detection method for an optical component of the embodiment, it is possible to detect a state of an optical component in a process of sheet metal processing, and it is possible to detect whether the optical component is deteriorated, or a degree of the deterioration.

BRIEF DESCRIPTION OF DRAWINGS

FIG. 8 is a flowchart showing an operation of the laser processing machine of the embodiment and a state detection method of the embodiment.

DESCRIPTION OF EMBODIMENT

Figure 1:
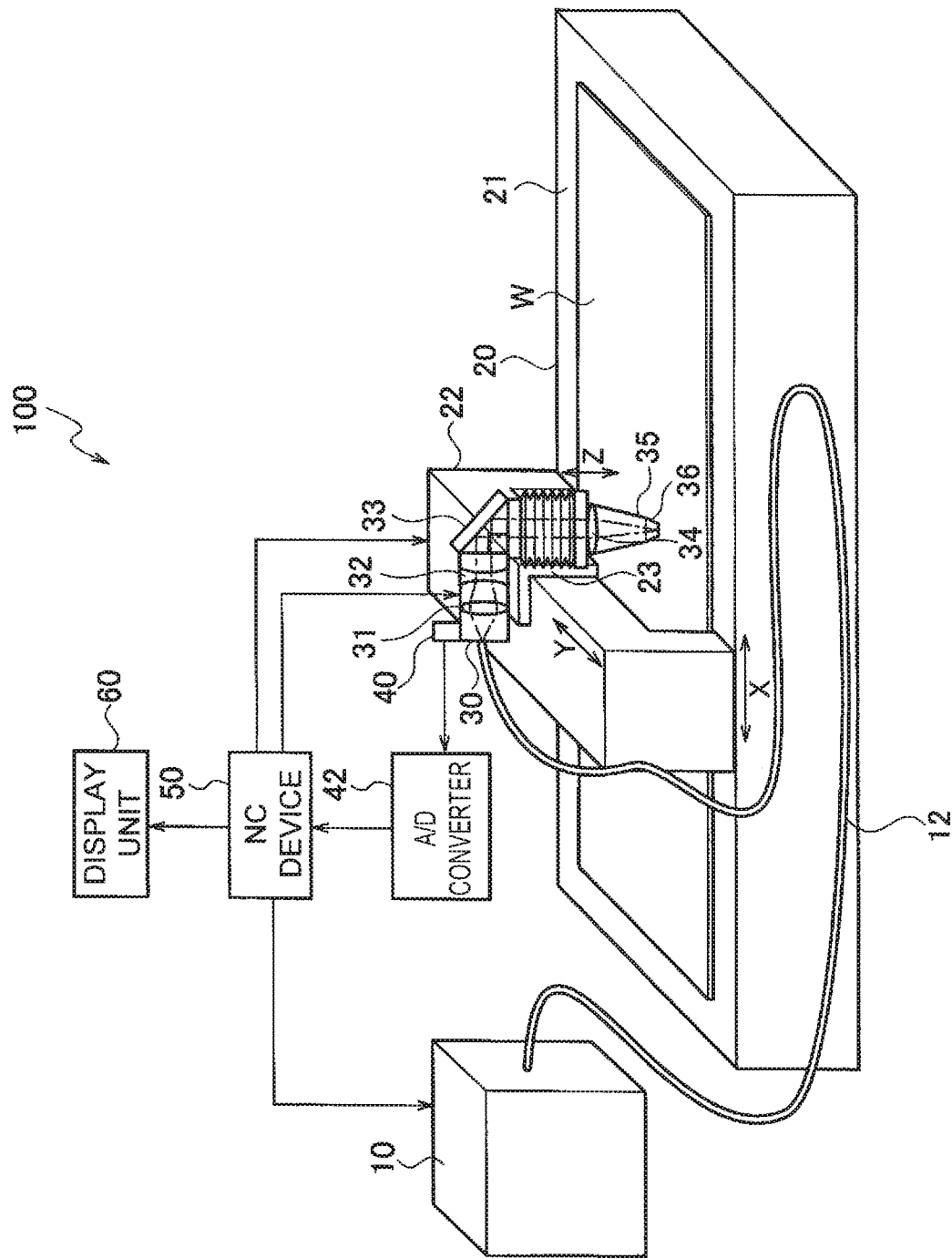
FIG. 1 is a view showing an example of an entire configuration of a laser processing machine according to an embodiment.

Hereinafter, description will be made as to a laser processing machine and a state detection method for an optical component according to an embodiment, with reference to the accompanying drawings. In FIG. 1, a laser processing machine 100 comprises a laser oscillator 10 that generates and emits a laser beam, a laser processing unit 20, and a process fiber 12 that transmits the laser beam to the laser processing unit 20. Furthermore, the laser processing machine 100 comprises a reflected light detection unit 40, an A/D converter 42, an NC device 50 that controls the whole laser processing machine 100, and a display 60. The NC device 50 is an example of a control device.

The laser processing machine 100 cuts a sheet metal W with the laser beam emitted from the laser oscillator 10. As described later in detail, the laser processing machine 100 is configured to detect a state of an optical component provided in the laser processing unit 20 in a processing process of cutting the sheet metal W, and notify a user if the optical component has a deteriorated state.

As the laser oscillator 10, a laser oscillator that amplifies excitation light emitted from a laser diode to emit a laser beam having a predetermined wavelength, or a laser oscillator that directly uses the laser beam emitted from the laser diode is suitable. Examples of the laser oscillator 10 include a solid laser oscillator, a fiber laser oscillator, a disc laser oscillator, and a direct diode laser oscillator (DDL oscillator).

The process fiber 12 is mounted along X-axis and Y-axis cable ducts (not shown) arranged in the laser processing unit 20.

The laser processing unit 20 includes a processing table 21 on which the sheet metal W is mounted, a gate type X-axis carriage 22 movable in an X-axis direction on the processing table 21, and a Y-axis carriage 23 movable in a Y-axis direction vertical to the X-axis direction on the X-axis carriage 22. Furthermore, the laser processing unit 20 includes a collimator unit 30 fixed to the Y-axis carriage 23.

The collimator unit 30 includes a convex lens 31 on which the laser beam emitted from an emission end of the process fiber 12 is incident, and a concave lens 32 on which the laser beam emitted from the convex lens 31 is incident. Furthermore, the collimator unit 30 includes a bend mirror 33 that reflects the laser beam emitted from the concave lens 32 downward in a Z-axis direction vertical to the X-axis and Y-axis. A processing head 35 is coupled to the collimator unit 30, and the processing head 35 includes a condenser lens 34 that condenses the laser beam reflected by the bend mirror 33. The processing head 35 has a tip to which a nozzle 36 configured to emit the laser beam is removably attached.

The collimator unit 30, the processing head 35 and the nozzle 36 form a beam irradiation unit that converts the laser beam, which is divergent light, to collimated light and then condenses the light to irradiate the sheet metal W. The beam irradiation unit includes a plurality of optical components.

As described later, the convex lens 31 and the concave lens 32 function as zoom lenses that vary a beam diameter D (see FIG. 2) of the laser beam emitted from the concave lens 32. The convex lens 31 and the concave lens 32 form an example of the optical component. In the present embodiment, the convex lens 31 is an inspected optical component from which deterioration of a state of the convex lens 31 is detected, but the inspected optical component is not limited to the convex lens constituting the zoom lens.

The convex lens 31 is a lens having a positive focal length, the concave lens 32 is a lens having a negative focal length, and the condenser lens 34 is a lens having a positive focal length. The condenser lens 34 is a convex lens. The convex lens 31 and the concave lens 32 have a function of a collimator lens that collimates individual beams of the incident laser beam. As described later, the convex lens 31, the concave lens 32 and the condenser lens 34 are configured to be movable in an optical axis direction.

The convex lens 31, the concave lens 32 and the bend mirror 33, having optical axes adjusted in advance, are arranged in the collimator unit 30, and the condenser lens 34 having an optical axis adjusted in advance is disposed in the processing head 35.

The collimator unit 30 is fixed to the Y-axis carriage 23 movable in the Y-axis direction, and the Y-axis carriage 23 is provided on the X-axis carriage 22 movable in the X-axis direction. Therefore, the laser processing unit 20 can move a position at which the sheet metal W is irradiated with the laser beam emitted from the nozzle 36, in the X-axis direction and the Y-axis direction.

According to the above configuration, the laser processing machine 100 transmits the laser beam emitted from the laser oscillator 10 to the laser processing unit 20 via the process fiber 12, and irradiates the sheet metal W with the laser beam condensed with the condenser lens 34, so that the sheet metal W can be cut.

Note that when the sheet metal W is cut, an assist gas to remove a molten material is jetted to the sheet metal W. FIG. 1 omits drawing a configuration that jets the assist gas.

Figure 2:
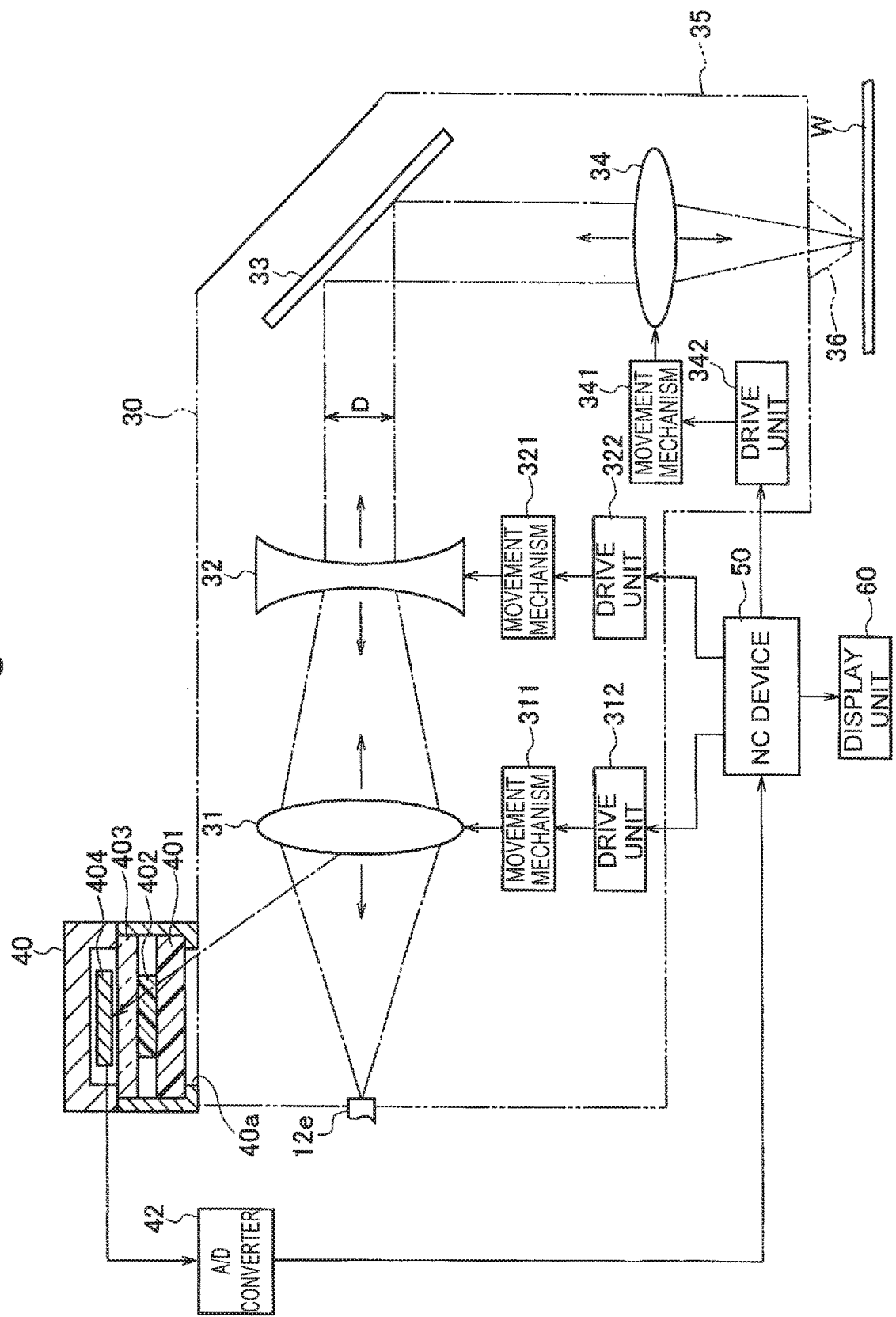
FIG. 2 is a view showing details of a part of the example of the configuration of the laser processing machine according to the embodiment.

A schematic configuration example where the convex lens 31, the concave lens 32 and the condenser lens 34 are movable will be described with reference to FIG. 2. In FIG. 2, the convex lens 31 and the concave lens 32 are attached to movement mechanisms 311 and 321 configured to move the convex lens 31 and the concave lens 32 in the optical axis direction (the X-axis direction of FIG. 1), respectively. The condenser lens 34 is attached to a movement mechanism 341 configured to move the condenser lens 34 in the optical axis direction (the Z-axis direction of FIG. 1).

The movement mechanisms 311, 321 and 341 may only be mechanisms configured to move the convex lens 31, the concave lens 32 and the condenser lens 34, respectively, for example, by using one of a gear, a belt, a rack and pinion, a worm gear or a ball screw (or any combination of these components).

The movement mechanisms 311, 321 and 341 are driven by drive units 312, 322 and 342, respectively, to move the convex lens 31, the concave lens 32 and the condenser lens 34 in the optical axis direction as shown by arrows. The drive units 312, 322 and 342 are, for example, motors. The NC device 50 controls the drive units 312, 322 and 342. Another control device connected to the NC device 50 may control the drive units 312, 322 and 342.

The NC device 50 controls the driving of the movement mechanisms 311 and 321 by the drive units 312 and 322, to adjust positions of the convex lens 31 and the concave lens 32 in accordance with preset processing conditions of the sheet metal W. Examples of the processing conditions of the sheet metal W include a type of material of the sheet metal W, a sheet thickness of the sheet metal W, and a condensing diameter of the laser beam. In a case where a focus position is set as the processing condition of the sheet metal W, the NC device 50 controls the driving of the movement mechanism 341 by the drive unit 342, to adjust the position of the condenser lens 34 in accordance with the set focus position.

In FIG. 2, the laser beam is emitted as the divergent light from an emission end 12e of the process fiber 12 as shown by a one-dot chain line. The convex lens 31 is disposed so that a distance from the emission end 12e to the convex lens 31 is equal to or more than the focal length of the convex lens 31. Therefore, the convex lens 31 converts the divergent light of the laser beam to convergent light. The NC device 50 can move the convex lens 31 in the optical axis direction on the condition that the distance from the emission end 12e to the convex lens 31 is equal to or more than the focal length of the convex lens 31.

If the concave lens 32 is disposed at an after-mentioned optimum position, the concave lens 32 converts the convergent light to parallel light (collimated light). The parallel light herein indicates that a luminous flux of laser beams is the parallel light. The parallel light emitted from the concave lens 32 is reflected by the bend mirror 33 to bend an optical path, and is incident on the condenser lens 34. The condenser lens 34 condenses the parallel light so that the focus position is on a surface of the sheet metal W or in a vicinity of the surface, to irradiate the sheet metal W with the laser beam.

Figure 3A:
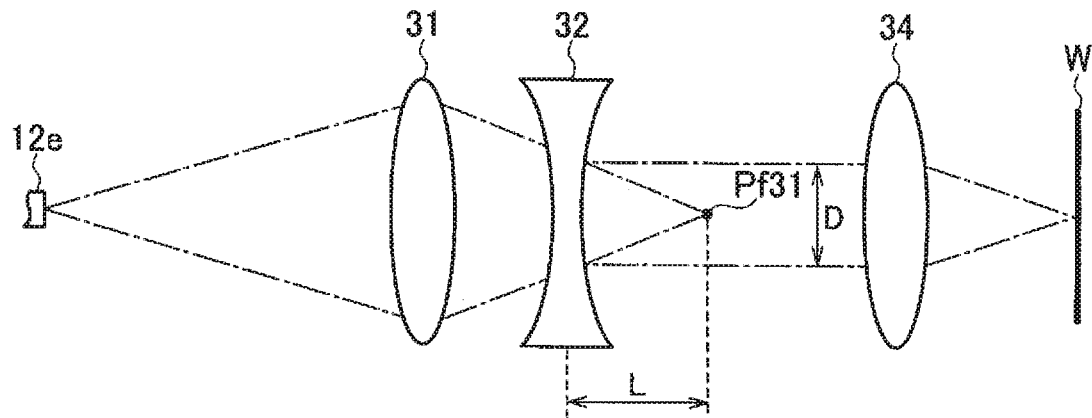
FIG. 3A is a conceptual diagram explaining an operation of a zoom lens shown in FIG. 2, and showing a state where a beam diameter of collimated light is maximized.
Figure 3B:
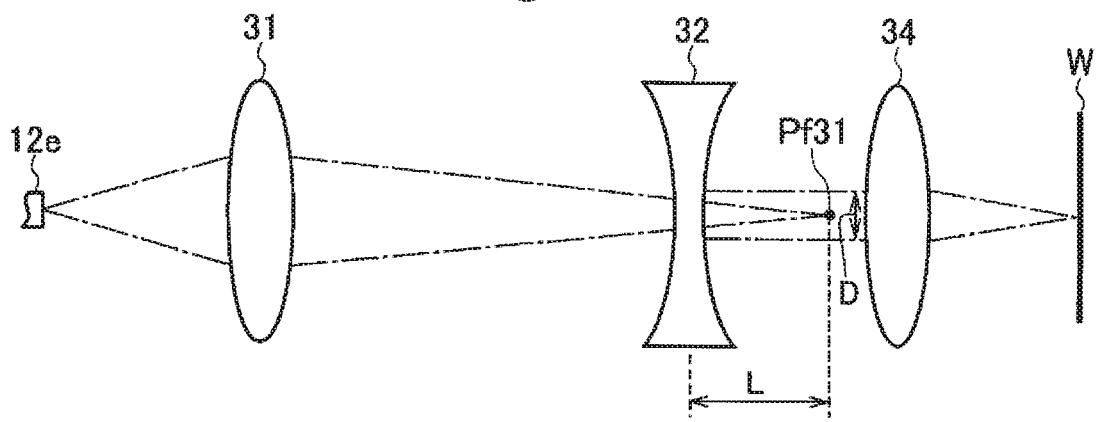
FIG. 3B is a conceptual diagram explaining the operation of the zoom lens shown in FIG. 2, and showing a state where the beam diameter of the collimated light is minimized.
Figure 3C:
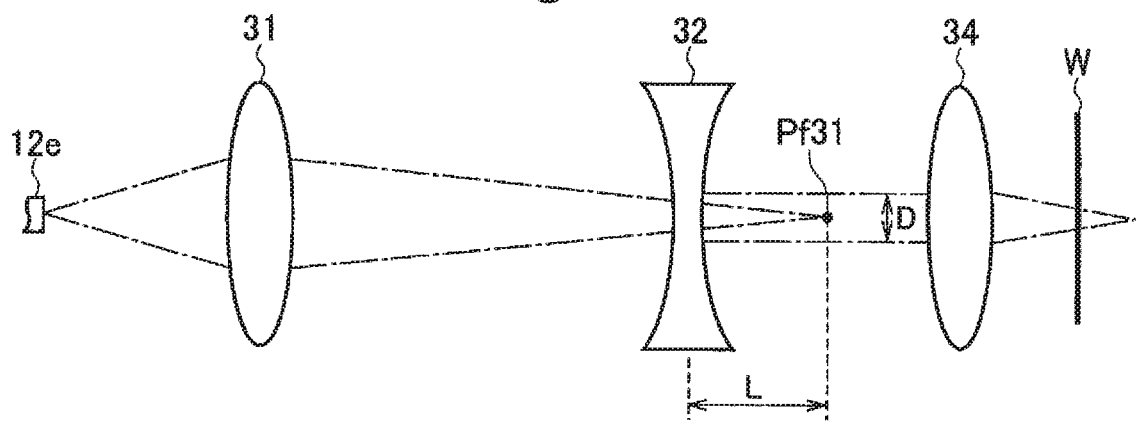
FIG. 3C is a conceptual diagram showing a state where the beam diameter of the collimated light is minimized, and a condenser lens is moved to change a focus position.

FIG. 3A to FIG. 3C omit the bend mirror 33 in FIG. 2, and conceptually show a state where the convex lens 31, the concave lens 32 and the condenser lens 34 are arranged to align optical axes as a straight line. In FIG. 3A to FIG. 3C, it is assumed that the concave lens 32 is not present, and a position at which the convergent light from the convex lens 31 is condensed is a point Pf31. If the concave lens 32 is disposed at a position shifted from the point Pf31 toward the convex lens 31 by a same distance L as the focal length of the concave lens 32, the concave lens 32 converts the convergent light to the parallel light.

As shown in FIG. 3A and FIG. 3B, the beam diameter D of the parallel light emitted from the concave lens 32 varies in accordance with a convergence angle of the convergent light emitted from the convex lens 31. FIG. 3A shows a state where the beam diameter D is maximum, and FIG. 3B shows a state where the beam diameter D is minimum.

Figure 4:
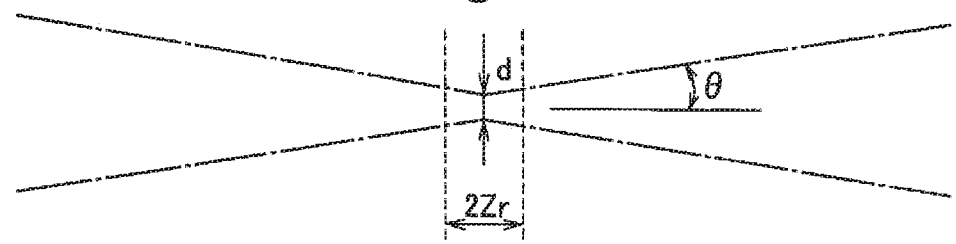
FIG. 4 is a diagram to explain a condensing diameter and a divergence angle of a laser beam.

FIG. 4 conceptually shows an enlarged region around a beam waist of the laser beam condensed on the surface of the sheet metal W or in the vicinity of the surface. A left side of FIG. 4 is an upside of the sheet metal W, and a right side thereof is a downside of the sheet metal W. A condensing diameter d shown in FIG. 4 is represented by Expression (1). Rayleigh length Zr is represented by Expression (2). In Expressions (1) and (2), BPP is a beam parameter product represented by a product of a radius d/2 of the beam waist and a half width at half maximum θ of a divergence angle of the beam, and f is the focal length of the condenser lens 34.

[Expression 1]
$$d = \frac{4 \cdot BPP \cdot f}{D} \quad (1)$$

[Expression 2]
$$Zr = \frac{4 \cdot BPP \cdot f^2}{D^2} \quad (2)$$

The BPP is not varied even if moving the convex lens 31 and the concave lens 32 or the condenser lens 34. Therefore, from Expressions (1) and (2), the condensing diameter d and Rayleigh length Zr are determined in accordance with the beam diameter D, and if the beam diameter D varies, the condensing diameter d and Rayleigh length Zr vary.

If the beam diameter D increases, the condensing diameter d and Rayleigh length Zr decrease, and a power density increases to form a beam profile suitable for a thin plate. If the beam diameter D decreases, the condensing diameter d and Rayleigh length Zr increase, and the power density decreases to form a beam profile suitable for a thick plate.

The NC device 50 calculates the beam diameter D being a targeted condensing diameter d based on Expression (1), and controls the drive units 312 and 322 so that the positions of the convex lens 31 and the concave lens 32 are located to obtain the calculated beam diameter D, to move the convex lens 31 and the concave lens 32.

Specifically, the NC device 50 moves the convex lens 31 so that the convergence angle of the laser beam emitted from the convex lens 31 becomes a convergence angle for a targeted beam diameter D. Additionally, the NC device 50 moves the concave lens 32 to the position shifted from the point Pf31 toward the convex lens 31 by the distance L, to convert the convergent light to the parallel light in accordance with the position of the convex lens 31 in the optical axis direction.

The NC device 50 calculates the positions of the convex lens 31 and the concave lens 32 to obtain the targeted beam diameter D and condensing diameter d, and moves the convex lens 31 and the concave lens 32. As seen from FIG. 3A and FIG. 3B, the condenser lens 34 condenses the parallel light, and hence even if the position of the concave lens 32 changes, the focus position of the laser beam does not change.

If the NC device 50 moves the condenser lens 34, the focus position can be changed as shown in FIG. 3C. The focus position is not set to the surface of the sheet metal W, and a position shifted from the surface or a back surface of the sheet metal W by a predetermined distance can be the focus position.

Turning to FIG. 2, a reflected light detection unit 40 is attached to a position shifted from the convex lens 31 toward the emission end 12e on an upper surface of the collimator unit 30. The reflected light detection unit 40 is disposed at a position on which reflected light reflected from an incidence surface of the laser beam of the convex lens 31 can be incident. An aperture 40a is formed in a housing of the reflected light detection unit 40. An aperture is also formed in a housing of the collimator unit 30. The reflected light detection unit 40 is disposed so that the aperture 40a faces the aperture of the collimator unit 30. Therefore, the reflected light from the convex lens 31 passes through the aperture of the collimator unit 30 and the aperture 40a, and is incident on an interior of the reflected light detection unit 40.

In the housing of the reflected light detection unit 40, a diffusion plate 401, a cold filter 402, a cold mirror 403 and a photodiode 404 are arranged in order from the aperture 40a. The diffusion plate 401 is, for example, an opal glass diffusion plate, and transmittance of the reflected light is about 40%. The cold filter 402 has a reflected light transmittance of about 2%, and attenuates infrared light. The cold mirror 403 has a reflected light transmittance of about 95%, and attenuates visible light. The photodiode 404 is an example of a photodetection element, and an imaging element may be used as the photodetection element.

The reflected light detection unit 40 shown in FIG. 2 is a preferable configuration example of the reflected light detection unit 40, but a specific configuration of the reflected light detection unit 40, such as a member other than the photodetection element and arrangement of the member, is not limited to FIG. 2. The reflected light detection unit 40 may only be configured so that the photodetection element detects the reflected light from the convex lens 31 and generates a detected value in accordance with the intensity of the reflected light. The detected value is, for example, a current value.

The photodiode 404 generates the current value in accordance with the intensity of the incident reflected light, and supplies the value to the A/D converter 42. The current value generated by the photodiode 404 detecting the reflected light will be referred to as a reflected light detection current value.

The A/D converter 42 converts the input reflected light detection current value to a digital value, and supplies the value to the NC device 50.

Figure 5:
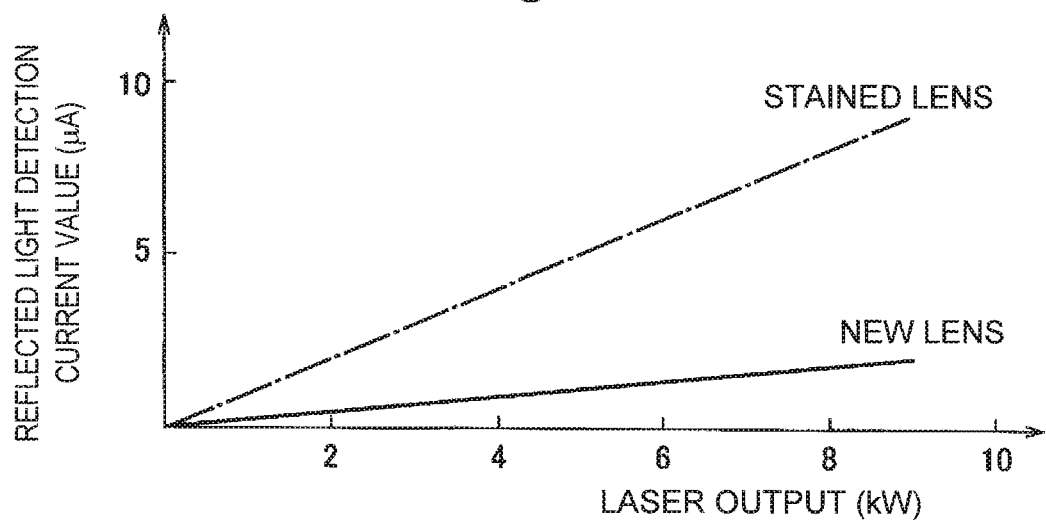
FIG. 5 is a characteristic diagram showing a relation between a laser output and a reflected light detection current value in each of a new lens and a stained lens.

FIG. 5 shows a relation between a laser output and the reflected light detection current value in each of a case where the convex lens 31 is a new lens and a case where the convex lens is a stained lens that is dirty and deteriorated due to use for a long period of time. A solid line shows the relation between the laser output and the reflected light detection current value in the former case, and a broken line shows the relation in the latter case. As the laser output of the laser beam emitted by the laser oscillator 10 increases, the intensity of the reflected light from the convex lens 31 increases. If the convex lens 31 is the stained lens, the intensity of the reflected light increases due to deterioration of an anti-reflective coating. Therefore, the reflected light detection current value in the case where the convex lens 31 is the stained lens is larger than that in the case where the convex lens 31 is the new lens.

Accordingly, it is possible to detect whether the convex lens 31 is deteriorated due to dirt or wear or to detect a degree of the deterioration, based on the reflected light detection current value. In the NC device 50, a threshold is set to detect whether the convex lens 31 is deteriorated, or the degree of the deterioration. If the threshold is a value, the NC device 50 can compare the input reflected light detection current value with the threshold to detect whether the convex lens 31 is deteriorated. If there are two or more threshold values, the NC device 50 can compare the input reflected light detection current value with each of a plurality of thresholds to detect the degree of the deterioration of the convex lens 31.

In the present embodiment, the reflected light detection unit 40 is configured to detect the reflected light from the convex lens 31, and the NC device 50 is configured to detect whether the convex lens 31 is deteriorated, or the degree of the deterioration, based on the intensity of the reflected light. Therefore, a state of the convex lens 31 can be detected in the processing process without affecting the processing process in which the laser processing machine 100 cuts the sheet metal W.

A preferable specific example where the laser processing machine 100 detects the state of the convex lens 31 in the processing process of the sheet metal W will be described with reference to FIG. 6 and FIG. 7.

Figure 6:
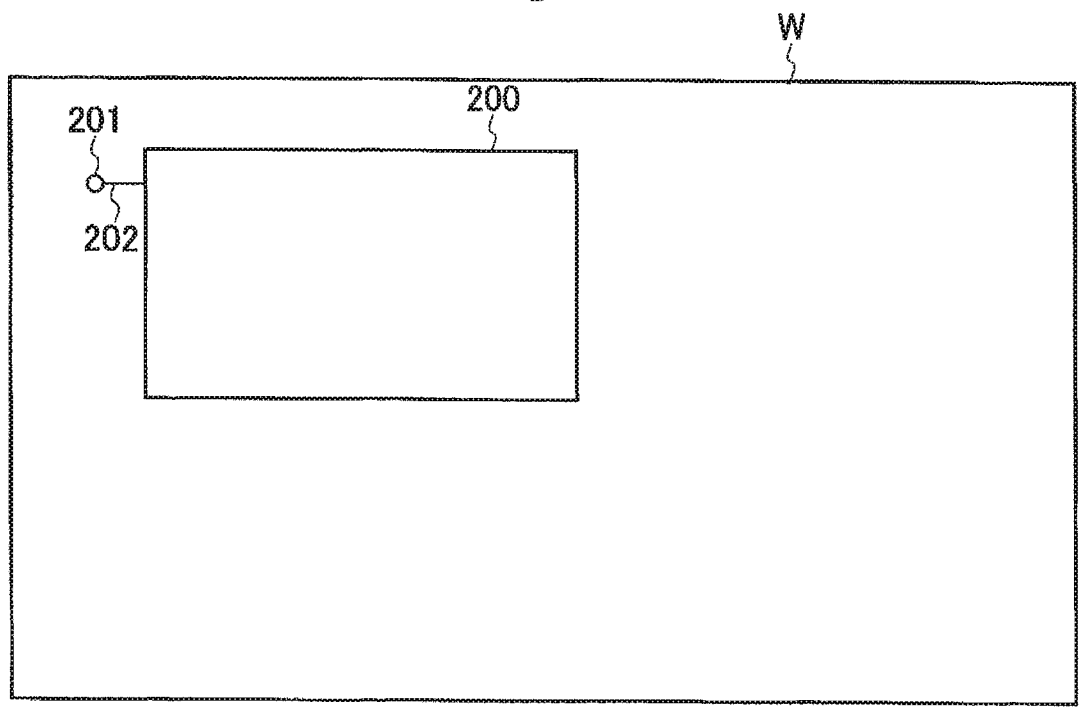
FIG. 6 is a diagram showing a method of processing a sheet metal in a case where the sheet metal is cut with a laser processing machine to manufacture a rectangular product.

FIG. 6 shows a cutting method of the sheet metal W in a case where the laser processing machine 100 cuts the sheet metal W to manufacture a rectangular product 200. The laser processing machine 100 forms a pierced hole 201 by piercing in a vicinity of a periphery of the product 200 outside the product 200, and cuts a linear approach 202 from the pierced hole 201 to a predetermined position of the periphery of the product 200. The laser processing machine 100 cuts the sheet metal W along the periphery of the product 200 from an end of the approach 202 on a product 200 side. The NC device 50 controls the laser processing machine 100 to cut the sheet metal W based on a processing program prepared in advance, thereby manufacturing the product 200.

Figure 7:
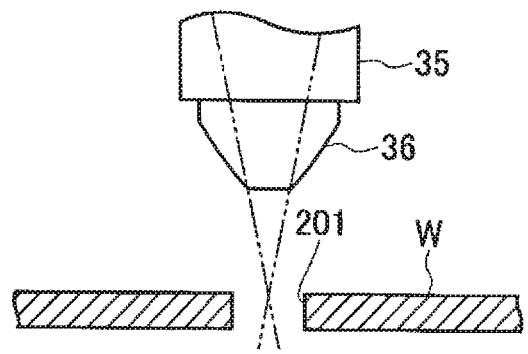
FIG. 7 is a diagram for comparison of a nozzle position and a beam diameter during piercing with those during state detection.
Figure 7:
Figure 7:
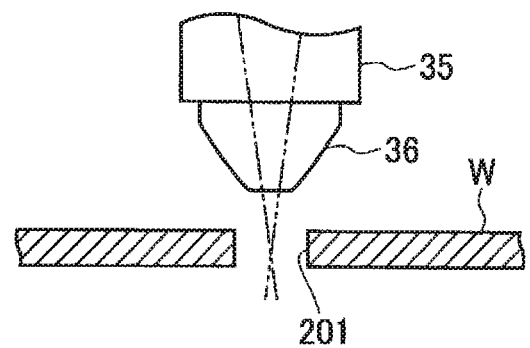

As shown in FIG. 7, the NC device 50 moves the processing head 35 upward so that a distance between a tip of the nozzle 36 and an upper surface of the sheet metal W during the piercing is larger than the distance during usual cutting of the sheet metal W. At this time, the NC device 50 executes control, for example, in a just focus state where the focus position is located on the upper surface of the sheet metal W. Upon completion of the piercing, the NC device 50 brings the processing head 35 close to the sheet metal W, to set the distance between the tip of the nozzle 36 and the upper surface of the sheet metal W to be equal to the distance during the usual cutting of the sheet metal W. The usual cutting of the sheet metal W includes cutting the approach 202 and the periphery of the product 200.

As shown in FIG. 7, the NC device 50 controls the laser processing machine 100 to lower the processing head to a position during the usual cutting, while maintaining a position of the processing head 35 along the surface of the sheet metal W at a position during the piercing, and to perform irradiation with the laser beam as inspection light for detecting the state of the convex lens 31. Therefore, an interior of the pierced hole 201 is irradiated with the inspection light. At this time, it is preferable that the NC device 50 adjusts the positions of the convex lens 31 and the concave lens 32 to minimize the beam diameter D.

The NC device 50 may set the laser output to a low output of, for example, 500 W with a continuous wave, and may control the laser processing machine 100 for the irradiation with the inspection light only for short time of about 0.1 seconds. During state detection, the NC device 50 controls the focus position to be a position slightly below the upper surface of the sheet metal W.

If an unprocessed region of the sheet metal W is irradiated with the inspection light, the unprocessed region is unfavorably processed. Even if the laser output is set to the low output, the surface of the sheet metal W is unfavorably discolored. If the interior of the pierced hole 201 is irradiated with the inspection light, the unprocessed region is not affected, and hence it is preferable that the interior of the pierced hole 201 is irradiated with the inspection light. By the irradiation with the inspection light in the state where the beam diameter D is minimum, the inspection light can be almost securely passed through the pierced hole 201. Furthermore, the irradiation of the interior of the pierced hole 201 with the inspection light does not require a process of moving the processing head 35 to the outside of the product 200, performing irradiation with the inspection light and then returning the position of the processing head 35.

The NC device 50 detects the state of the convex lens 31 based on the reflected light detection current value during the irradiation with the inspection light. If it is detected that the reflected light detection current value is smaller than the threshold and that the state of the convex lens 31 is satisfactory, the NC device 50 controls the laser processing machine 100 to cut the approach 202 and to cut the sheet metal W along the periphery of the product 200.

Thus, according to the present embodiment, the state of the convex lens 31 can be detected in a series of processing processes of piercing, approach processing, and periphery cutting of the product 200, when the laser processing machine 100 cuts the sheet metal W to manufacture the product 200. Additionally, a side effect that the unprocessed region of the sheet metal W is processed does not occur.

The operation of the laser processing machine 100 and the state detection method will be described anew with reference to a flowchart shown in FIG. 8. A case where two thresholds of a first threshold and a second threshold larger than the first threshold are set to the NC device 50 is described as an example.

In FIG. 8, if an instruction to start manufacturing a predetermined product such as the product 200 is made, the NC device 50 controls the laser processing machine 100 to pierce the sheet metal W based on the processing program in step S. The NC device 50 controls the laser processing machine 100 for the irradiation with the inspection light in step S2.

The NC device 50 determines whether the reflected light detection current value is equal to or more than the first threshold in step S3. If the reflected light detection current value is not equal to or more than the first threshold (NO), it is indicated that the state of the convex lens 31 is satisfactory, and the NC device 50 controls the laser processing machine 100 to process the approach in step S8. Then, in step S9, the NC device 50 controls the laser processing machine 100 to cut the periphery of the product.

In step S10, the NC device 50 determines whether the cutting of the periphery of the product is completed. If the cutting of the periphery is not completed (NO), processing is returned to the step S9. If the cutting of the periphery is completed (YES), the NC device 50 ends processing of manufacturing the product.

On the other hand, if the reflected light detection current value is equal to or more than the first threshold in the step S3, the NC device 50 determines whether the reflected light detection current value is equal to or more than the second threshold in step S4. If the reflected light detection current value is not equal to or more than the second threshold (NO), the convex lens 31 has a state to such an extent that the manufacturing of the product is not to be stopped, but the convex lens 31 is dirty or worn. Therefore, in step S5, the NC device 50 causes the display 60 to display an attention message thereon, and the processing proceeds to the step S8.

As an example, the attention message is a message that notifies a user of a need for cleaning or replacing the optical component such as the convex lens 31, e.g., "the lens is dirty and hence please request for maintenance". The attention message may be a predetermined message.

In a case where the reflected light detection current value is equal to or more than the first threshold and is not equal to or more than the second threshold, the product is manufactured in steps S8 to S10 in the same manner as in a case where the state of the convex lens 31 is satisfactory.

If the reflected light detection current value is equal to or more than the second threshold (YES), it is indicated that the state of the convex lens 31 is very poor. The NC device 50 stops the processing of manufacturing the product in step S6, and causes the display unit 60 to display a warning message thereon in step S7, to end the processing.

As an example, the warning message is a message that notifies the user of an immediate need for cleaning or replacing the optical component, e.g., "the lens is dirty and hence the processing is stopped. Immediately, please request for the maintenance". The warning message may be a predetermined message.

The present invention is not limited to the present embodiment described above, and can be variously modified without departing from a gist of the present invention. In the present embodiment, the convex lens 31 is described as the inspected optical component, but the concave lens 32 may be the inspected optical component. Furthermore, the inspected optical component is not limited to the lens, and may be a mirror such as the bend mirror. Any optical component in the beam irradiation unit can be the inspected optical component.

The present disclosure is associated with a subject described in Japanese Patent Application No. 2018-091101 filed on May 10, 2018, and the entire disclosure of Japanese Patent Application No. 2018-091101 is incorporated herein by reference.

The invention claimed is:
1. A laser processing machine comprising:
a laser oscillator configured to emit a laser beam;
a beam irradiation unit including a plurality of optical components and configured to convert a laser beam, which is divergent light, to collimated light and then to condense the light to irradiate a sheet metal;
a photodetection element configured to detect intensity of reflected light reflected by an inspected optical component that is one of the plurality of optical components; and
a control device configured to: execute control in such a manner that a pierced hole is formed, by piercing the sheet metal with a laser beam emitted from the laser oscillator and supplied to the beam irradiation unit, for cutting the sheet metal to manufacture a product, and then the pierced hole is irradiated with a laser beam emitted from the laser oscillator and supplied to the beam irradiation unit as inspection light, the inspection light passing through the pierced hole; and compare, with a threshold, the intensity of the reflected light detected by the photodetection element during the irradiation with the inspection light, to detect whether the inspected optical component is deteriorated, or a degree of the deterioration.

2. The laser processing machine according to claim 1, wherein the beam irradiation unit includes a zoom lens configured to vary a beam diameter of the collimated light, and
the inspected optical component is the zoom lens.

3. The laser processing machine according to claim 2, wherein the control device controls the zoom lens to minimize a beam diameter of the collimated light, when the pierced hole is irradiated with the inspection light.

4. The laser processing machine according to claim 1, wherein a laser output of the inspection light is lower than a laser output of the laser beam for piercing the sheet metal.

5. A state detection method for an optical component, the state detection method comprising:
piercing a portion of a sheet metal for cutting the sheet metal to manufacture a product with a laser beam emitted from a laser oscillator;
irradiating the pierced hole with a laser beam emitted from the laser oscillator as inspection light so as to pass through the pierced hole;
detecting intensity of reflected light reflected by an inspected optical component during the irradiation with the inspection light; and
comparing the intensity of the reflected light with a threshold, to detect whether the inspected optical component is deteriorated, or a degree of the deterioration.

6. The state detection method for the optical component according to claim 5, wherein the inspected optical component is a zoom lens configured to convert the laser beam, which is divergent light, to collimated light, and vary a beam diameter of the collimated light, and
the zoom lens is controlled to minimize the beam diameter of the collimated light, when the pierced hole is irradiated with the inspection light.

7. The state detection method for the optical component according to claim 5, further comprising displaying a predetermined message on a display, when the inspected optical component is deteriorated, or in accordance with the degree of the deterioration.

8. The state detection method for the optical component according to claim 5, wherein a laser output of the inspection light is lower than a laser output of the laser beam for piercing the sheet metal.

9. A laser processing machine comprising:
a laser oscillator configured to emit a laser beam;

a collimator unit including a lens;

a processing head including a condenser lens configured to irradiate a focused laser beam onto a sheet metal;

a photodiode or an imaging element configured to detect intensity of reflected light reflected by the lens included in the collimator unit; and an NC device configured to execute control to form a pierced hole by piercing the sheet metal with a laser beam emitted from the laser oscillator and supplied to the collimator unit, to irradiate a laser beam emitted from the laser oscillator and supplied to the collimator unit as inspection light so as to pass through the pierced hole, to compare, with a threshold, the intensity of the reflected light detected by the photodiode or the imaging element during the irradiation with the inspection light, and to detect whether the inspected lens is deteriorated, or a degree of the deterioration.

10. A laser processing machine according to claim 9, wherein a laser output of the inspection light is lower than a laser output of the laser beam for piercing the sheet metal.

\* \* \* \* \*